Figure 1:
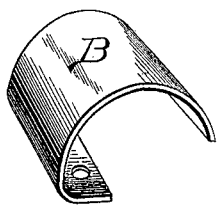

No. 658,920. Patented Oct. 2, 1900.
H. LIEBERTHAL.
WHEEL.
(Application filed June 21, 1900.)
(No Model.)

Witnesses:
JB Keir
Ira D. Perry

Inventor:
Hyman Lieberthal
by Bond, Adams, Pickard & Jackson
his Attys.

UNITED STATES PATENT OFFICE.

HYMAN LIEBERTHAL, OF CHICAGO, ILLINOIS.

WHEEL.

SPECIFICATION forming part of Letters Patent No. 658,920, dated October 2, 1900.

Application filed June 21, 1900. Serial No. 21,064. (No model.)

*To all whom it may concern:*

Be it known that I, HYMAN LIEBERTHAL, a citizen of the United States, residing at Chicago, in the county of Cook and State of Illinois, have invented certain new and useful Improvements in Wheels, of which the following is a specification, reference being had to the accompanying drawings.

My invention relates to wheels designed, primarily, for use on bicycles, but which are adapted for use with other styles of vehicles where it is desirable to have as great freedom as possible from jolts and jars incident to the passing over uneven roads and over obstructions on the road.

The object of my invention is to provide a wheel with a tire having the advantages of the ordinary pneumatic tire, but without the disadvantage that all such pneumatic tires are subject to—viz., the liability of being punctured. I accomplish this by means of a series of springs secured to the rim of the wheel and inclosed by a suitable flexible covering or tire proper, said springs being independent of each other and being each secured in place to the rim at one end only, all as shown in the drawings and hereinafter specifically described.

That which I regard as new will be set forth in the claims.

Figure 2:
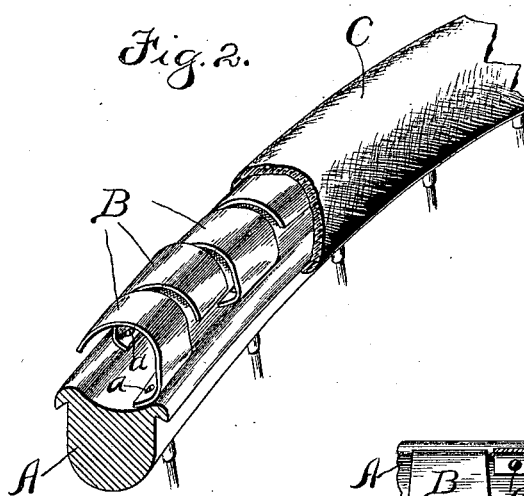
Figure 3:
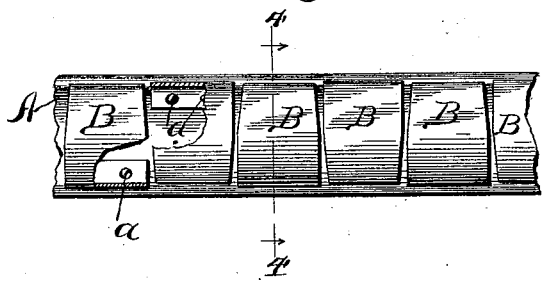
Figure 4:
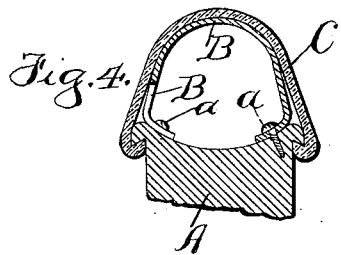

In the accompanying drawings, Figure 1 is a perspective view of one of the series of springs. Fig. 2 is a perspective view of a portion of a wheel-rim with the outer covering or tire proper broken away to show the arrangement of the springs. Fig. 3 is a top or plan view with the covering or tire proper removed, and Fig. 4 is a vertical section at line 4 4 of Fig. 3.

Referring to said drawings, A indicates a portion of a rim of a bicycle-wheel constructed as usual.

B indicates a series of flat springs arranged side by side upon the rim A and each firmly secured in place at one end only to the rim by any suitable fastening, such as the screw $a$, the springs being secured, as shown, alternately on opposite sides of the rim A. These springs are curved up and over the rim A and by having one end free from attachment to the rim are adapted to have a greater degree of movement than if confined at both ends and will yield when the wheel passes over an obstruction. By having a large number of independently-acting springs a very decided advantage is obtained over that style of wheel wherein a long spirally-coiled spring is employed or where a long curved spring-plate is used, for in my construction with springs of proper material the effect of passing over an obstruction is felt at only one place and cannot be transmitted by the cushioning means to other parts of the rim or the covering forming the tire proper, and with properly-constructed springs any one spring can yield sufficiently in passing over an obstruction to practically prevent any shock to the rider.

By fastening alternate springs at opposite ends to the rim such springs will press outward in such manner as to give to the covering or tire proper the same even and rounded appearance that would be given if such springs were each secured at both ends and with the advantage of a freer and more beneficial action when the wheel passes over an obstruction than if the springs had both ends fastened down. Another advantage of having a large number of independently-acting springs over one long spring is that in case of a break or other damage the outer covering can be removed or partially removed and the damage quickly and cheaply repaired by removing the small broken spring and substituting a new one.

It is desirable that the springs B be close to each other, so that no very great portion of the tread of the covering or tire proper be unsupported or unprotected. I have found that when flat springs having parallel edges are thus placed quite close to each other side by side there is apt to be more or less binding between the adjacent edges of two springs as the free ends move up and down, owing to the fact that the free ends are sometimes moved slightly sidewise as well as up and down, which sidewise movement sometimes causes the free ends to catch on the edges of the adjacent fixed ends. To remedy this, I reduce the width of each spring somewhat at one end, and this construction allows the free ends of the two springs at each side of a fixed end to move without catching, while at the same time the tread portion of the covering or tire proper is not to any great extent left unsupported or unprotected at any point throughout its length.

C indicates the covering or tire proper that has been referred to, which may be of any suitable material and be secured in any appropriate manner to the rim A.

That which I claim as my invention, and desire to secure by Letters Patent, is—

1. The combination with the rim of a wheel, of a series of curved springs alternately secured at one end to one side of the rim and the other end thereof extending above the opposite side of the rim but in alinement therewith, and a suitable covering for the said springs.

2. The combination with the rim of a wheel, of a series of bowed springs extending transversely of said rim and alternately secured at one end thereto and the other end thereof extending above the opposite side of the rim, and a flexible cover for the said springs.

3. In a wheel, a series of bowed springs extending transversely of the rim of the wheel and alternately secured thereto, and a suitable covering for the said springs.

4. The combination with the rim of a wheel, of a series of curved springs extending transversely of said rim and alternately secured thereto at one end, said springs narrower at one end than at the other, and a suitable covering for said springs, substantially as set forth.

5. In a wheel, a series of alternately-arranged springs extending transversely of the rim of the wheel and provided with a fast and free end, and a suitable covering for the said springs.

HYMAN LIEBERTHAL.

Witnesses:
HELEN M. COLLIN,
ALBERT H. ADAMS.